INVENTOR.
ALVIN E. BROWN

INVENTOR.
ALVIN E. BROWN

United States Patent Office 3,420,102
Patented Jan. 7, 1969

3,420,102
ACOUSTIC FLUID METERING DEVICE
Alvin E. Brown, Cupertino, Calif., assignor to Lockheed Aircraft Corporation, Burbank, Calif.
Filed Dec. 15, 1966, Ser. No. 601,934
U.S. Cl. 73—194  3 Claims
Int. Cl. G01f 1/00

ABSTRACT OF THE DISCLOSURE

In an acoustic fluid metering device, an oscillator is modulated by a voltage controlled oscillator (VCO). The resulting signal is transmitted through an intervening fluid medium to a receiver whose output signal and the VCO output are compared in a phase detector. The frequency range of the VCO is set so the path length of the intervening medium provides a needed quadrature to operate the phase detector. The output of the phase detector is integrated and used to control the VCO.

---

Devices providing for the measurement of fluid flow by a "Sing-around" ultrasonic path are well known. See U.S. Patent No. 3,290,934, issued to Alvin E. Brown et al., entitled, "Acoustic Fluid Metering Device," of which reference is herein made. These devices comprise of a piezoelectric transmitter and receiver facing each other with a fixed and known distance of separation. A sharp electrical transient is applied to the transmitter piezoelectric ceramic, which causes the ceramic to vibrate at its resonant frequency. The mechanical vibration of the ceramic produces corresponding compressional waves in the intervening medium which travel to the receiver at the effective velocity of propagation of the medium. The effective velocity of propagation is the algebraic sum of the actual sonic velocity of propagation C and the flow velocity component of the medium V relative to the measuring axis. The transient time of the ultrasonic burst $T_1$ is a function of the effective velocity of propagation C and the path length of the pulse D or $$T_1 = L/(C+V)$$

The receiver piezoelectric ceramic produces a signal corresponding to the compression waves in the medium. This signal is amplified and formed into a trigger pulse corresponding to the first arrival of sound at the receiver. If this trigger pulse is used as an electrical transient which excites the transmitter, a self sustained oscillation will result at a frequency $F_1$, such that $F_1 = (C+V)/L$. It will be noted from the above equation that the accurate measurement of propagation velocity by a velocimeter depends on the flow component being zeroed since any flow will have a direct effect on the frequency of the celocimeter. This flow dependency of velocimeters form the basis of the Sing Around Flow Meter.

It is possible to make use of the flow dependents of velocimeters by placing two identical instruments in opposition and exposing them to the same flow. In this configuration, the effective velocity of propagation for the second instrument will be the algebraic difference of the actual velocity of propagation and the flow. Thus, the frequency $F_2$ at which the second velocimeter will operate will be $$F_2 = (C-V)/L$$

By using the two independent frequencies produced by the velocimeters as inputs to a modulator, additional frequencies are generated. The modulation components which are of interest are the sum frequency and the difference frequency. The difference frequency $F_D$ becomes:

$$F_D = F_1 - F_2$$

or $$F_D = 2V/L$$

The frequency thus generated is directly proportional to the flow and independent of the changes of the velocity of propagation. The flow meter also provides an output which is proportional to the actual velocity of propagation. This signal is obtained by taking the sum frequency from the modulator. This sum frequency $F_S$ becomes $$F_S = F_1 + F_2$$

or $$F_S = 2C/L$$

Thus, by separating the two primary output frequencies of the flow meter configuration, it is possible to obtain both flow independent of propagational velocity, and propagational velocity independent of the flow.

It is the object of the present invention to provide an improved acoustic flow metering device by reducing error signals which are prevalent at low flow rates.

Another object of the present invention is to provide an acoustic flow metering device which is more accurate than was previously possible.

These and other objects of the present invention will become apparent to those skilled in the art of acoustic flow metering after a perusal of the following specification and drawings in which.

Figure 1:
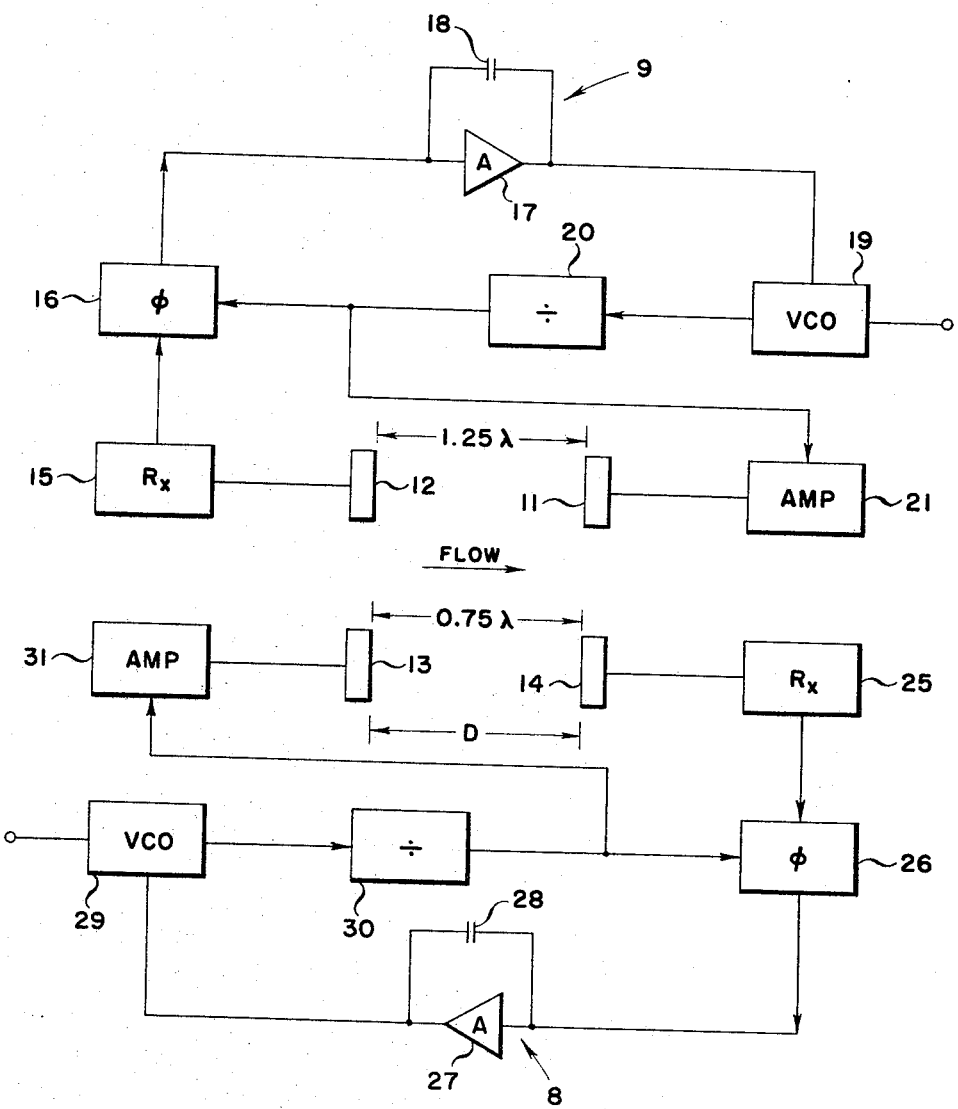
FIGURE 1 is a block diagram of the electronic circuit of the present invention.

Referring now to the drawings, a first transmitting transducer 11 is spaced a distance D from a first receiving transducer 12. In actual practice the transmitting and receiving transducers would be positioned on opposite sides of a pipe in which a fluid would be flowing. A second transmitting transducer 13 is spaced a distance D from a second receiving transducer 14. The configuration is so arranged such that transmitting transducer 11 and receiving transducer 12 define a first path and transmitting transducer 13 and receiving tranducer 14 defined a second transmitting path in opposite direction from the first path. It is contemplated that all transducers would be a piezoelecric ceramic.

Figure 3:
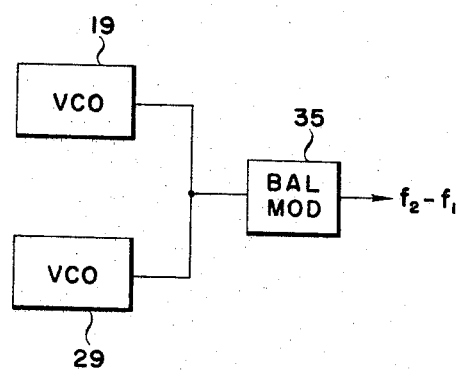
FIGURE 3 is a block diagram showing the output portion of the invention.

Describing first the up-stream loop, receiving transducer 12 is connected to a receiver 15 which is in turn connected to a phase detector 16. The output from phase detector 16 is connected to integrator circuit 9 comprising amplifier 17 and capacitor 18. The output from the integrator circuit 9 is connected to a voltage controlled oscillator 19 (VCO) which is in turn connected to a frequency divider 20, for example a bi-stable multivibrator. Frequency divider 20 has a output connected to phase detector 16 and to amplifier 21 which in turn is connected to transmitting transducer 11. A similar loop of components is connected between transmitting transducer 13 and receiving transducer 14. This second or down stream loop comprises receiver 25, phase detector 26, an integrator 8 comprising amplifier 27 and capacitor 28, a VCO 29, frequency divider 30, and amplifier 31. As shown in FIGURE 3, both VCO 19 and VCO 29 have outputs connected to a balanced modulator 35.

Figure 2:
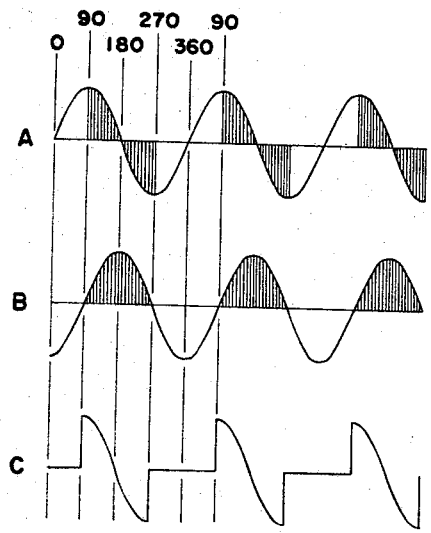
FIGURE 2 shows a plurality of wave forms associated with FIGURE 1.

Let's assume that both amplifiers are producing signals which are being transmitted by transmitting transducers 11 and 13 through the intervening fluid medium, for example, water, to receive the transducers 12 and 14. Considering first only one loop, the received signals are sent to phase detector 16 through receiver 15. Phase detector 16 also receives an input signal from VCO 19. If the distance D between transmitting transducer 11 and receiving transducer 12 is, for example, 0.75λ, where λ is the wave length of the frequency being transmitted, a quadrature or quarter wave shift is obtained as seen in FIGURE 2. In FIGURE 2, wave form A represents the input to the phase detector 16 from the receiver 15, and wave form B represents the input from VCO 19. Phase detector 16 is a selected type which produces an output only when the input from VCO 19 is positive. The output from phase detector 16, represented by wave form C, is then integrated in integrator circuit 9 which produces the control voltage for VCO 19. If the output from the phase detector 16 is symmetrical, the output from integrator 9 reflects the symmetrical input and no change in output voltage is produced. The VCO is controlled by the DC voltage at which integrator 9 is operating. Let us now assume that the frequency from receiver 15 shifts, reflecting a change in flow velocity of the medium. Phase detector 16 is now receiving input frequencies that are different. The output from phase detector 16 will no longer be symmetrical. Integrator 9 which averages the output voltage from phase detector 16 will produce an output voltage either greater than or less than its previous operating voltage depending on the direction of phase shift. If the frequency is higher, the output from integrator 9 will produce a higher output, causing the VCO to produce a higher output frequency until the phases are back to a quadrature condition. The operation of the second loop is exactly the same. The output frequencies from both VCO 19 and VCO 29 are fed to a balanced modulator 35 to produce an output frequency equal to the difference frequency of operation of VCO 29 and VCO 19. This difference frequency $f_0$, is directly proportional to the velocity of flow of the medium.

A serious problem in the operation of flowmeters of this type occurs at low flow rates. As the flow rate approaches zero, the frequency of oscillation of both VCO's become very close. During this condition, the VCO's have a tendency to lock, thus giving a frequency difference of zero. Since it is possible to calibrate acoustic flow meters at zero flow, especially for meters measuring flow in large diameter pipe, e.g. >20 inches diameter, it becomes very important to know precisely when a "no flow" condition exists.

The tendency of the two VCO's to lock frequencies can be circumvented by selecting the frequency of oscillation of the VCO's at 0.75λ and 1.25λ respectively, where λ is the wave length equal to the distance D between the transmitting and receiving transducers. Since the wave length λ is proportional to $1/f_0$, $f_0$ may be considered a reference frequency at a "no flow" condition in the medium. Transmitter 11 is set to operate at a frequency having a wave length of 1.25λ, or 5/4λ, then $5/4\lambda = 4/5 f_0$. Transmitter 13 should then operate at a frequency of 3/4 $f_0$, a frequency having a wave length of 0.75λ. If the distance D is chosen properly for a frequency of 400 cycles per second, then transmitter 11 should transmit a signal at 3/4 $f_0$, or 300 c.p.s. and transmitter 13 should transmit a signal at 500 c.p.s. By selecting these operating frequencies, or similar frequencies, there is no possibility that the VCO's will lock at "no flow" conditions as there will always be a large difference in operating frequencies between the VCO's.

It is sometimes desirable to have both VCO's operate at the same frequency during the "no flow" condition since the outputs from the VCO's are to be compared in a balanced modulator 35. This result may be achieved by proper selection of the operating frequency of the VCO's and through the use of dividers 20 and 30. Since the ratio of transmission frequencies is 300/500 or 3/5, a frequency which is a multiple of the 3/5 ratio is a proper selection for the operating frequency of the VCO. 1500 c.p.s. is such a frequency of operation for the VCO's. The 1500 c.p.s. output from VCO 19 is then divided by a factor of 5, enabling transmitter 11 to operate at 300 c.p.s. The 1500 c.p.s. output from VCO 29 is divided by a factor of 3, enabling transmitter 13 to operate at 500 c.p.s.

Figure 4:
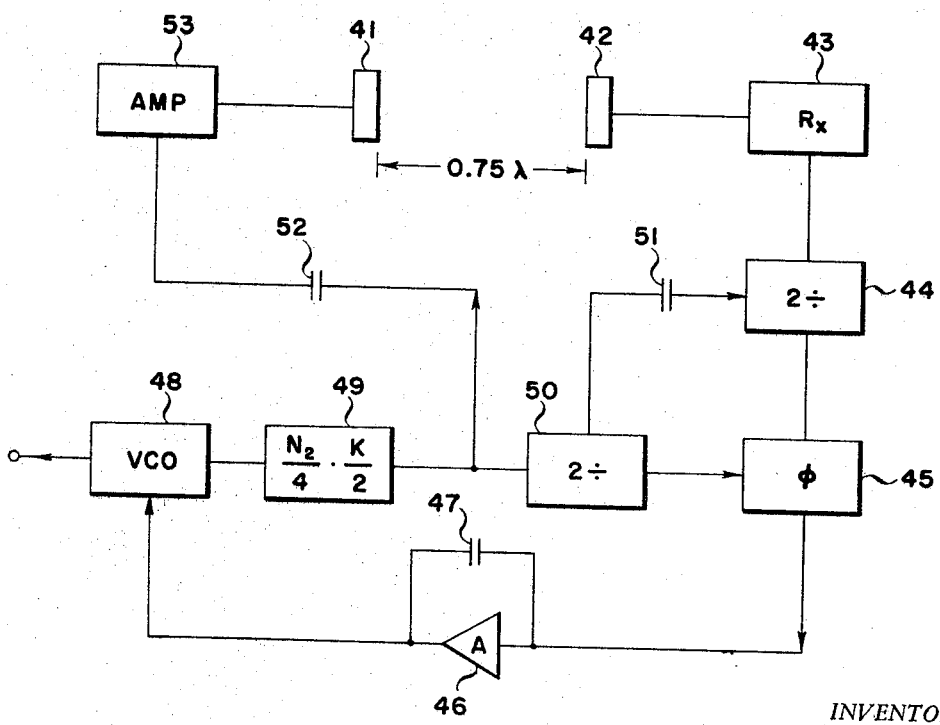
FIGURE 4 is an alternate embodiment of FIGURE 1.

Another advantage gained in operating the VCO's at a higher frequency is that the greater frequency difference obtained per unit of flow change permits precise readings. FIGURE 4 shows an alternate embodiment of the present invention. Only one loop is shown, for example, the down stream loop wherein a series of pulses or spikes of energy are produced by a differentiator-divider 49. These pulses, amplified by amplifier 53, will launch a series of ultrasonic burst into the medium. The pulses are received by receiver 43 and fed to phase detector 45 through frequency divider 44. In order for phase detector 45 to operate in its proper quadrature, the pulses of energy are fed to divider 44 which additionally produces a square wave output. A similar divider 50 feeds the pulses of energy from differentiator-divider 49 to phase detector 45. To insure the correct polarity output from flip-flop 44, a capacitor 51 couples divider 50 to divider 44 to correctly synchronize the circuit so that a positive signal is obtained. A second, upstream loop (not shown) would of course be provided to obtain flow velocity information.

If we assume VCO 48 is operating during "no flow" at 1500 c.p.s., $N_2$ should be selected as the number of quarter waves in the opposite fluid medium path. (Not shown.) The term K is a constant, conveniently selected for scaling factors.

It is noted that many changes and modifications could be made in the embodiments described, all made within the spirit and scope of the invention as set forth in the following claims.

What is claimed is:

1. In an improved fluid metering device including a first supersonic transmitter and a first receiver located in acoustic contact with a fluid stream such that signals are transmitted through said stream from said transmitter to said receiver in a direction generally up stream of said fluid flow, a second supersonic transmitter and a second receiver located at such space points in said fluid stream that signals are transmitted through said stream to said second receiver in a direction generally down stream of said fluid flow: the improvement comprising a first feedback path coupling the output of said first receiver to the input of said first transmitter; said first feedback path including a first phase detector operably connected to receive the output from said first receiver; a first voltage controlled oscillator operably connected to receive the output from said first phase detector; means whereby the output from said first voltage controlled oscillator is operably connected to said first transmitter and to said first phase detector; means whereby the wave length of the output from said first voltage controlled oscillator at a "no flow" condition of the stream is selected to operate at a frequency having an odd number of quarter wave lengths with respect to the path length between the first transmitter and first receiver; a second feedback path coupling the output of said second receiver to the input of said second transmitter, said second feedback path including a second phase detector operably connected to receive the output from said second receiver; a second voltage controlled oscillator operably connected to receive the output from said second phase detector; means whereby the output from said second voltage controlled oscillator is operably connected to said second transmitter and to said second phase detector; means whereby the output from said second voltage controlled oscillator at a "no flow" condition of the stream is selected to operate at a frequency having an odd number of quarter wave lengths with respect to the path length between said second transmitter and receiver, said first and second voltage controlled oscillation operating at different quarter wave lengths; and means connected to said first and second feedback paths for deriving an output signal proportional to the velocity of flow of said fluid stream.

2. In a fluid metering device according to claim 1 further including; a first integrating circuit operably connected between said first phase detector and said first voltage controlled oscillator and a second integrating circuit operably connected between said second phase detector and said second voltage controlled oscillator.

3. In a fluid metering device according to claim 2 further including a first frequency divider operably connected to said first voltage controlled oscillator and a second frequency divider operably connected to said second voltage controlled oscillator.

References Cited

UNITED STATES PATENTS

| | | | |
|---|---|---|---|
| 2,826,912 | 3/1958 | Kritz | 73—194 |
| 2,949,773 | 8/1960 | Batchelder | 73—194 |
| 3,007,339 | 11/1961 | Hill | 73—194 |

RICHARD C. QUEISSER, *Primary Examiner.*

CHARLES A. RUEHL, *Assistant Examiner.*